US00RE40091E

(19) United States
(12) Reissued Patent
Fried

(10) Patent Number: US RE40,091 E
(45) Date of Reissued Patent: Feb. 19, 2008

(54) COMPUTERIZED SYSTEM AND METHOD FOR CREATING A BUYBACK STOCK INVESTMENT REPORT

(76) Inventor: David R. Fried, 350 Surfview Dr., Pacific Palisades, CA (US) 90272-2913

(21) Appl. No.: 09/613,153

(22) Filed: Jul. 6, 2000

Related U.S. Patent Documents

Reissue of:
(64) Patent No.: 6,035,286
Issued: Mar. 7, 2000
Appl. No.: 09/030,854
Filed: Feb. 26, 1998

(51) Int. Cl.
*G06Q 40/00* (2006.01)

(52) U.S. Cl. ..... 705/36 R; 705/35; 705/37
(58) Field of Classification Search ..... 705/35, 705/36
See application file for complete search history.

(56) References Cited

U.S. PATENT DOCUMENTS

| | | | | | |
|---|---|---|---|---|---|
| 4,376,978 | A | * | 3/1983 | Musmanno | 705/36 |
| 4,953,085 | A | * | 8/1990 | Atkins | 705/36 |
| 5,132,899 | A | * | 7/1992 | Fox | 705/36 |
| 5,761,442 | A | * | 6/1998 | Barr et al. | 705/36 |
| 5,806,048 | A | * | 9/1998 | Kiron et al. | 705/36 |
| 5,978,778 | A | * | 11/1999 | O'jShaughnessy | 705/36 |

FOREIGN PATENT DOCUMENTS

WO WO 97/24833 * 7/1997

OTHER PUBLICATIONS

Corporate Stock Buyback Are Soaring Exchange Seeks to Make Put' Options Part of the Strategy, Treasure Manager's Report; Feb. 16, 1996: vol. 4 Issue: 4.*

Acquisitions May Make More Sense That Share Buybacks in Current Market, Analysts Say, Petroleum Finance Week; Feb. 16, 1998; vol. 6 Issue: 7.*

Hedging tools provide portfolio security blanket, Koflowitz, L. Wall Street Computer Review; Mar. 1, 1989; vol. 6 Issue: 6.*

Psst . . . want a hot stock tip? Bet insiders' info on the web, Mark Roberti, HomePC; Oct. 1, 1996; Issue: p. 174.*

Targeted repurchases and common stock returns, Mikkelson, W.H.; Ruback, R.S., Rand Journal of Exonomics; Dec. 1, 1991; vol. 2 Issue: 4 p. 544–61.*

Nations Funds Offers Two New Managed Index Funds; Combining Active and Passive Portofio Management, Business Editors Business Wire; Oct. 1997.*

How to Find a Stock That's Headed for Trouble, Business Week; New York; Dec. 30, 1996; Weiss, Gray.*

Stock Buyback Programs–Stocks, Michael Griffs, Apr. 6, 1998http://stocks.miminingco.com/library/week...TMog=56669803893354&Mint=56669803893354.*

(Continued)

*Primary Examiner*—Yehdega Retta
(74) *Attorney, Agent, or Firm*—Finnegan, Henderson, Farabow, Garrett & Dunner, L.L.P.

(57) ABSTRACT

A computer implemented method for creating an investment report. A database of stock information is screened based upon buyback ratio and prices/sales ratio selection criteria. The buyback ratio represents the percentage of stocks repurchased by a company during a given period that resulted in a net decrease in outstanding shares. The method and system use the criteria to identify companies with a highest buyback ratio and with the lowest price/sale ratio. The resulting list of stocks are ranked and output in an investment report that provides superior return over conventional investment techniques.

81 Claims, 2 Drawing Sheets

OTHER PUBLICATIONS

"The New Issues Puzzle," Tim Loughran and Jay R. Ritter, The Journal of Finance, vol. 1. No. 1, Mar. 1995, pp. 23–51.*

Market Underreaction to Open Market Share Repurchase, Working Paper No. 106, Feb. 1995, David Ikenberry, Josef Lakonishok, and Theo Vermaelon.*

"What Works on Wall Street, A Guide to the Best–performing Investment Strategies of All Time," James P. O'Shaughnessy, pp. 105–122.*

"Commentary: Buybacks Make News, But Do They Make Sense?", Nanette Byrness, Business Week, Aug. 12, 1996, pp. 1–2.*

"Stock Buybacks Arent' Always Good Sign for Investors, "Wall Street Journal, Jul. 3, 1997 Suzanne McGee and Greg Ip.*

"The Big Three's Dilemma," Alex Taylor III, FORTUNE, Mar. 16, 1998.*

"The Hidden Meanings of Stock Buybacks," Ray Bartkus, FORTUNE, Sep. 8, 1997.*

Equity portfolio Investment Computing (EPIC), Ford Investment Services, Inc. 1997.*

Putting their money where their mouths are; Forbes; New York; Hulbert; http://proquest.lumi.com/pqdweb?TS=...1&Did=000000011403201&Mtd=1&Fm, Apr. 1997.*

A buyback binge.; Steven; U.S. News & World Report, v122, n6, p. 69, Feb. 1997.*

What to do with pofits; Glassman; special to The Washington Post; http://www.recordernews.com/1997/0920/business/wehat/wehat.htm, Sep. 1997.*

The option to repurchase stock; Financial Management; Tampa; Ikenberry; Vermaelen, 1996.*

Actual Share Reacquisitions in Open–Market Repurchases Programs; Stephens and Weisbach; The Journal of Finance, v1, n1, Feb. 1998.*

Martket underraction to open market share repurchases; Journal of Financial Economics 39; 181–208; Ikenberry, Lakonishok, Vermaelen; Feb. 1995.*

Solving antidilution problems, Stephen; Business Lawyer, 51, n4, 1241–1302; Apr. 1997.*

* cited by examiner

COMPUTERIZED SYSTEM AND METHOD FOR CREATING A BUYBACK STOCK INVESTMENT REPORT

Matter enclosed in heavy brackets [ ] appears in the original patent but forms no part of this reissue specification; matter printed in italics indicates the additions made by reissue.

BACKGROUND

1. Field of Invention

The present invention relates generally to the field of investment portfolio management. More particularly, the present invention relates to a computerized method and system for creating a stock investment report based on a buyback investment strategy.

2. Description of Related Art

Investment in accordance with the stock buyback theory is based on the premise that a company's management is in the best position to determine when the company stock is over or under valued. Further, it has been postulated that companies announcing a stock buyback tend to outperform the overall market. For example, in the article entitled "Market Underreaction to Open Market Share Repurchases," by D. Eikenberry and J. Lakonishok, Journ. of Finance (1994), the authors demonstrate that companies announcing stock buybacks outperformed the market by a margin of up to 9% in the four years after the initial repurchase announcement. The study did not follow the companies, however, to determine their performance for any action, (i.e., actual repurchase to decrease the percentage of outstanding shares) after the announcements were made. Conversely, in "The New Issues Puzzle," by J. Ritter and T. Loughran, Journ. of Finance (1996), the authors demonstrated that companies issuing shares, whether through an initial public offering (IPO) or secondary offering, underperformed the market by 7% annually during a five year period after the stock's issuance. These studies demonstrate a company's ability to buy low and sell high in terms of their own stock. Currently, there is conflicting literature, however, as to whether companies actually repurchasing their stock outperform others in the market.

To develop successful investment strategies, financial advisers currently rely on a myriad of theories and factors in an attempt to find the best investment vehicles for their clients. These theories are often based on age-old economic trends or newly developed calculations and stock screening techniques. One such recognized value factor for predicting or analyzing company performance is the price/sales ratio. The price/sales ratio is the relationship of a company's stock price to its annual sales (or revenues) per share. In the book, What Works on Wall Street, by J. P. O'Shanunnasey (1996), the author showed that the 50 stocks with the lowest price/sales ratio out performed the market by an average of 4.27 percentage points from Dec. 31, 1952 to Dec. 31, 1994. This level of outperformance was greater than the difference produced by any single variable.

There is, however, no single method that combines the performance of the price/sales ratio with the buyback theory to maximize the performance of a stock investment portfolio. In fact, many experts in the field discount the importance of buyback statistics, and those recognizing its potential have not thought to combine it with a company's price/sales statistics.

Therefore, there exists a need for an investment strategy that automatically determines those companies buying back the greatest percentage of their stock while maintaining the lowest price/sales ratio. The results of this method should help investors develop a strategy that combines the benefits of the price/sales ratio value factor with the stock buyback theory.

SUMMARY OF THE INVENTION

Systems and methods consistent with the present invention address these needs by combining data processing and information gathering techniques with a computer apparatus to determine those companies with the highest stock buyback percentage and lowest price/sales ratio.

Specifically, in accordance with the purpose of the invention as embodied and broadly described herein, a method executed by a computer with access to a database of stock information is provided for creating a buyback investment report. The method includes the steps of: receiving a request specifying a selection of stocks from a database of stock information; selecting criteria for screening the selection of stock, wherein the selected criteria consists of a buyback ratio and at least one of price/sales ratio and a price/earnings ratio for each stock, screening the selection of stocks the screening process including the substeps of identifying the stocks from the specified selection having buyback ratios, wherein a buyback ratio corresponds to a percentage of issued stock repurchased from the public during a specified period resulting in a decrease of shares outstanding, and identifying a price/sales ratio or price/earnings in the group for each such stock of a subset of the stocks having buyback ratios, wherein the subset is determined based on the buyback ratio for each stock; and ranking stocks within the subset based on the price/sales ratio or price/earnings for each stock, wherein the stock having the lowest price/sales ratio or price/earnings ratio is ranked the highest.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate systems and methods consistent with this invention and, together with the description, explain the principles of the invention.

In the drawings.

DETAILED DESCRIPTION

The following description of embodiment of this invention refers to the accompanying drawings. Where appropriate, the same reference numbers in different drawings refer to the same or similar elements.

Systems and methods consistent with the present invention provide investors with the means to select an investment group based on a set of selection criteria consisting of a buyback ratio and price/sales or price/earnings ratio to improve investment return.

Figure 1:
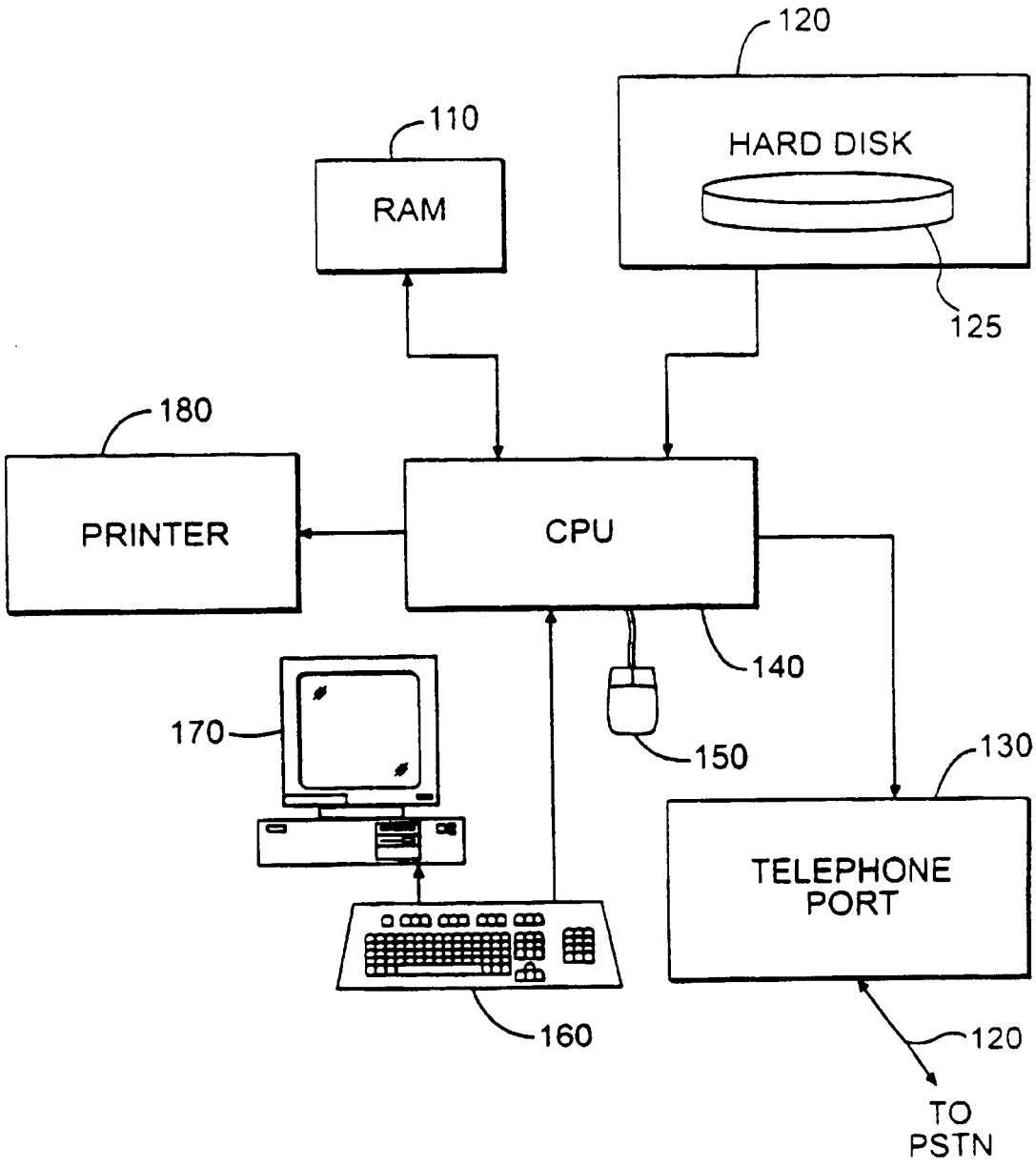
FIG. 1 is a block diagram of a computerized stock portfolio management system consistent with the present invention.

FIG. 1 is a block diagram showing a computerized system for generating a buyback stock report. Preferably, system 100 comprises a standard computer terminal capable of receiving user initiated input commands, processing data, and outputting the results for the user (for example, an IBM compatible personal computer would meet these requirements). System 100 consists of RAM 110, hard disk 120, telephone port 130, Central Processor Unit (CPU) 140, mouse 150, keyboard 160, video display 170, and a printer 180. These components may be standard off-the-shelf hardware. For example, CPU 140 may be a Pentium processor, and video display 170 may be a NEC MultiSync 3V monitor. Telephone port 130 connects CPU 140 to a public switched telephone network (PSTN).

Preferably, hard disk 120 includes a database 125 of company stock profiles including detailed information fields. Stock information database 125 is preferably input to system 100 via standard data transfer methods, such as a magnetic media exchange or manual keyboard transcription. Once entered, the stock information database 125 is stored on hard disk 120. The Equity Portfolio Investment Computing (EPIC) database from Ford Investment Services, Inc. is an example of a stock information database suitable for use with systems consistent with the present invention. Stock database 125 may also be stored at a remote location and accessed via a secure network through a PSTN and telephone port 130 or a carrier wave from a server on the Internet. Moreover, database 125 could be stored on a computer readable media such as a floppy disk, a CD-ROM, a optical disk, etc., and accessed when the following method is executed.

Figure 2:
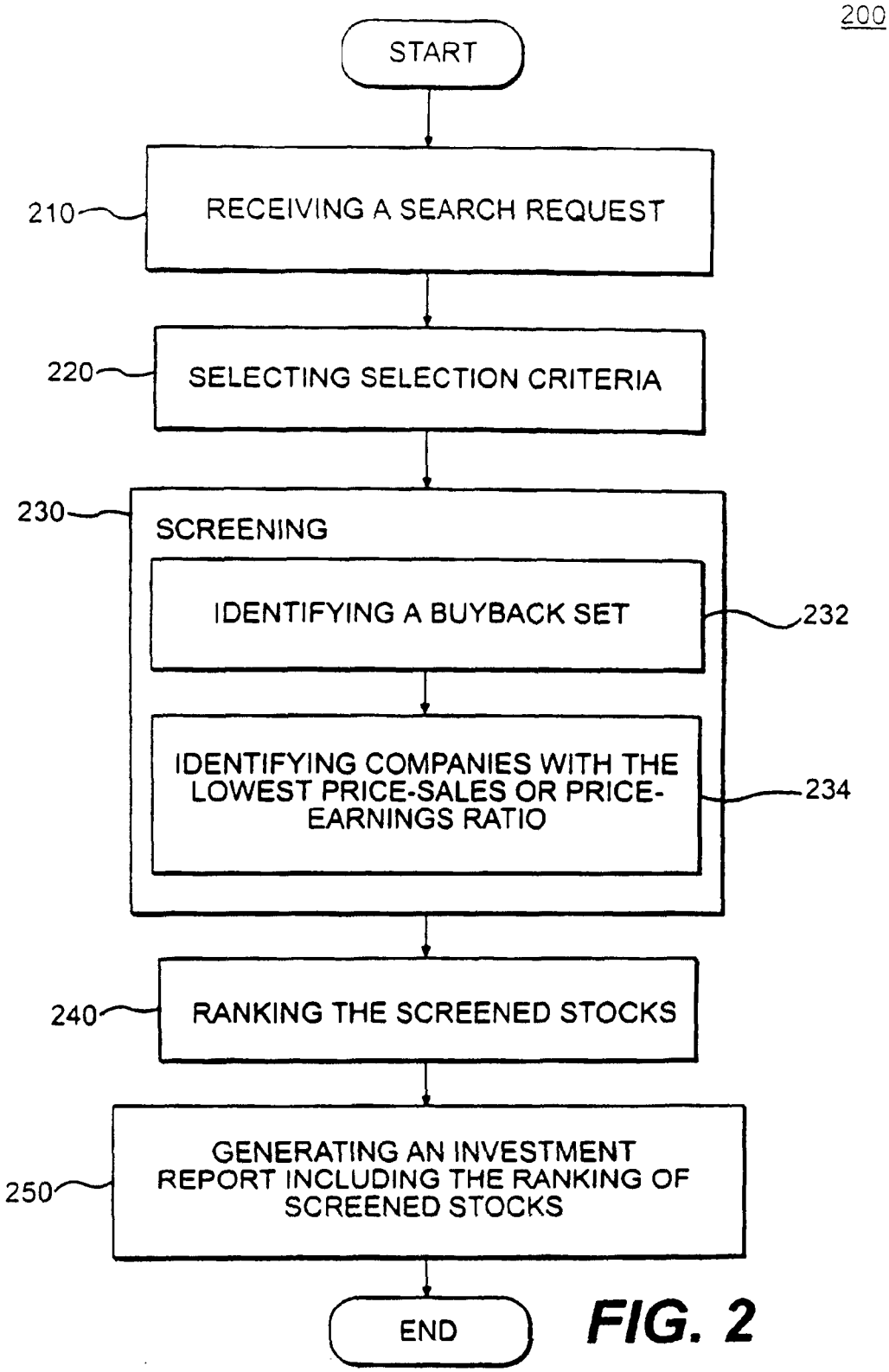
FIG. 2 is a block diagram of a method of automatically generating a buyback investment report consistent with the present invention.

FIG. 2 is a flow diagram showing a method 200 for generating a buyback stock report consistent with the present invention. Method 200 is implemented with system 100 to generate a stock investment portfolio and establish a buyback investment strategy. Preferably, stock database 125 has been previously stored in the hard disk 120, or is located on one of the alternative media, as noted above.

Initially, a user selects a group of stocks to search. This request is entered into system 100 by the user with keyboard 160 or some other standard input apparatus, such as a microphone or mouse 150. Any selection of stocks can be searched with the present embodiment, but preferably the selection consists of stocks in the Standard and Poor's 500 or the Dow Jones Industrial Average. Upon receiving the request (Step 210), system 100 screens the selection in accordance with selection criteria received by the user (Step 220). The screening step is preformed by the various components of the computer, in conjunction with software stored on a computer readable medium or embedded in RAM 110. The computer component uses conventional searching and processing techniques, such as text based searching, data field searching, or the like.

In the preferred embodiment, the selection criteria consists of a company's buyback ratio and either the price/sales ratio or the price/earnings ratio. The buyback ratio is the percentage of stocks repurchased by the issuing company over a given period that results in a net percentage decrease of the outstanding shares. Further, companies within the selection of stocks preferably have a market capitalization value to identify the value of the company, and the selection criteria consists of price/sales ratio or price/earnings ratio depending on whether the company value is in the higher or lower half, respectively, of a market capitalization value table preferably stored within database 125.

The selection criteria of the present invention has been empirically proven to outperform other selection criteria over the same time period. For example, testing has shown that the buyback ratio in conjunction with price/sales or price/earnings ratio criteria resulted in a portfolio with an annual return rate of 24.4 percentage points from Nov. 30, 1982 to Nov. 30, 1996. Further, larger portfolios developed using these particular selection criteria consistently outperformed the Standard and Poor 500 by 9.23% annually (i.e., 26.29% verses 17.06%, respectively). These statistics demonstrate that the selection criteria provide results superior to other previously disclosed combination of stock screening criteria.

System 100 uses the selection criteria to screen the selection of stocks by first, identifying a buyback subset within the selection of stocks (Step 232). For the purposes of the preferred embodiment, the buyback subset comprises those companies repurchasing their outstanding stock during a given period, thereby decreasing the percentage of outstanding shares. The period, which the user includes in his initial request, can be for any time period (ie., 6 month, 12 months, 5 years, etc.) depending upon the investor's particular investment criteria. Ideally, the user performs, method 200 several times, and thereby determines the optimal time period for which to gather data.

In the preferred embodiment, the user defines the level of buyback that constitutes a valuable selection criteria. This level is based upon buyback criteria stored within database 125, such as the percentage of outstanding stocks repurchased that cause a decrease in the number of shares outstanding, the average price of stocks repurchased, the overall volume of stocks repurchased during the selected period, the price yield—dividends paid per dollar invested, or price book value, etc. Other factors for selecting the buyback subset are equally within the scope of the present invention.

While these parameters (i.e., buyback level, time period, etc.) are preferably included with the initial request, they may be entered at various points throughout the performance of method 200. In this alternate embodiment, the user would be prompted via monitor 170 to enter a particular selection parameter that system 100 needed to perform its next processing step.

After determining the buyback subset, system 100 identifies those companies in the buyback subset with the lowest price/sales ratio or lowest price/earnings ratio (Step 234). Preferably, the user also informs system 100 what level of price/sales ratio or price earnings ratio is too high to be of interest to the investor. Again, in the preferred embodiment, the initial selection request may include this level, or the user could be prompted via monitor 170 to input his or her particular selection parameter.

Next, the screened stocks are ranked to provide a listing satisfying the criteria input by the user (Step 240). Preferably, ranking is done to give the user a workable listing of stocks in an order best suited for evaluation and investment. In the preferred embodiment, the screened stocks are ranked from lowest to highest price/sales ratio or lowest to highest price/earnings ratio. Finally, the ranking of stocks are generated and output by system 100 in the form of an investment report (Step 250). While this report is outputted directly to printer 180, the report may be, alternatively, stored on a standard computer storage medium such as a CD-Rom, a floppy disk, or data tape, for later use or manipulation by the user. Once stored, the stock report, or portfolio, can be rebalanced over a business investment period to determine the particular period (i.e., monthly, annually, quarterly, etc.) that would provide the best results for the investor. Rebalancing is a known method of reevaluating the stocks in the portfolio to determine whether the companies contained therein meet the particular investment criteria originally defined.

It will be appreciated by those skilled in this art that various modifications and variations can be made to the method and system consistent with the present invention described herein without departing from the spirit and scope of the invention. Other embodiments of the invention will be apparent to those skilled in this art from consideration of the specification and practice of the invention disclosed herein. For example, while the preferred embodiment is described in terms of a local processing machine, one skilled in the art will recognize that the processing could be performed remotely by one or many computing systems. This remote processing would occur, for example, if a service provided users with phone-line access to a stock database, and chose to perform the processing procedures, for a fee, where the database resided. In this case, the output could be forwarded to the user via standard electronic means (i.e., e-mail) or other communication methods (i.e., fax, mail, etc.).

It is intended that the specification and examples be considered exemplary only, with a true scope and spirit of the invention being indicated by the following claims.

I claim:

1. A computer implemented method for creating a buyback investment report comprising the steps of:

receiving a request specifying a selection of stocks from a database of stock information;

selecting criteria for screening the selection of stock, wherein the selected criteria consists of a buyback ratio and at least one of price/sales ratio and a price/earnings ratio for each stock, screening the selection of stocks, the screening process including the substeps of identifying the stocks from the specified selection having buyback ratios, wherein a buyback ratio corresponds to a percentage of issued stock repurchased from the public during a specified period and resulting in a decrease of shares outstanding, and identifying a price/sales ratio or price/earnings *ratio* in the group for each such stock of a subset of the stocks having buyback ratios, wherein the subset is determined based on the buyback ratio for each stock; and ranking stocks within the subset based on the price/sales ratio or price/earnings *ratio* for each stock, wherein the stock having the lowest price/sales ratio or price/earnings ratio is ranked the highest.

2. The method of claim 1, wherein the database includes a market cap value table for identifying the market cap value of each company, and wherein the substep of identifying [a] the price/sales ratio or *the* price/earnings *ratio* includes the substeps of selecting the price/sales ratio for the companies in a top half of market cap table; and selecting the price/earnings ratio for the companies in a bottom half of market cap table.

3. The method of claim 1, wherein the request specifies the Standard and Poor index, and wherein the screening step includes the substeps of:

searching the Standard and Poor index within the database; and identifying the companies having buyback ratios in the Standard and Poor index.

4. The method of claim 1, wherein the request specifies the Dow Jones Industrial Average, and wherein the screening step includes the substeps of:

searching the Dow Jones Industrial Average within the database; and identifying the companies having buyback ratios in the Dow Jones Industrial Average.

5. The method of claim 1, wherein the selection criteria includes a buyback level and the substep of identifying the companies having buyback ratios further includes the substep of:

identifying the companies in accordance with the buyback selection level.

6. The method of claim 5, wherein the buyback selection level is a price value of stocks repurchased.

7. The method of claim 5, wherein the buyback selection level is a numerical volume of stocks repurchased.

8. The method of claim 1, further including the steps of generating an investment report comprising the ranking of stocks; and outputting the investment report.

9. The method of claim 8, wherein the outputting step of includes the substep of:

storing the investment report on a storage medium.

10. A computerized investment management system for creating an investment report, comprising:

means for receiving a request specifying a selection of stocks from a database of stock information;

means for selecting criteria for screening the selection of stock, wherein the selected criteria consists of a buyback ratio and at least one of price/sales ratio and a price/earnings ratio for each stock, means for screening the selection of stocks including means for identifying the stocks from the specified selection having buyback ratios, wherein a buyback ratio corresponds to a percentage of issued stock repurchased from the public during a specified period and resulting in a decrease of shares outstanding, and means for identifying a price/sales *ratio* or price/earnings ratio in the group for each such stock of a subset of the stocks having buyback ratios, wherein the subset is determined based on the buyback ratio for each stock; and means for ranking stocks within the subset based on the price/sales ratio or price/earnings *ratio* for each stock, wherein the stock having the lowest price/sales ratio or price/earnings ratio is ranked the highest.

11. The system of claim 10, wherein the database includes a market cap value table for identifying the market cap value of each company, and wherein the means for identifying a price/sales ratio or price/earnings *ratio* includes means for selecting the price/sales ratio for the companies in a top half of market cap table; and means for selecting the price/earnings ratio for the companies in a bottom half of market cap table.

12. The system of claim 10, wherein the request specifies the Standard and Poor index, and wherein the means for screening includes:

means for searching the Standard and Poor index within the database; and means for identifying the companies having buyback ratios in the Standard and Poor index.

13. The system of claim 10, wherein the request specifies the Dow Jones Industrial Average, and wherein the means for screening includes:

means for searching the Dow Jones Industrial Average within the database; and means for identifying the companies having buyback ratios in the Dow Jones Industrial Average.

14. The system of claim 10, wherein the selection criteria includes a buyback level and the means for identifying the companies having buyback ratios further includes:

means for identifying the companies in accordance with the buyback selection level.

15. The system of claim 14, wherein the buyback selection level is a price value of stocks repurchased.

16. The system of claim 14, wherein the buyback selection level is a numerical volume of stocks repurchased.

17. The system of claim 10, further including:

means for generating an investment report comprising the ranking of stocks; and means for outputting the investment report.

18. The system of claim 17, wherein outputting means includes:

means for storing the investment report on a storage medium.

19. A computer program product for generating a buyback investment report comprising:

a receiving module configured to receive a request specifying a selection of stocks from a database of stock information;

a selecting module configured to select criteria for screening the selection of stock, wherein the selected criteria consists of a buyback ratio and at least one of price/sales ratio and a price/earnings ratio for each stock, a screening module configured to screen the selection of stocks including a first identifying module configured to identify the stocks from the specified selection having buyback ratios, wherein a buyback ratio corresponds to a percentage of issued stock repurchased from the public during a specified period and resulting in a decrease of shares outstanding, and a second identifying module configured to identify a price/sales ratio or price/earnings *ratio* in the group for each such stock of a subset of the stocks having buyback ratios, wherein the subset is determined based on the buyback ratio for each stock; and a ranking module configured to rank stocks within the subset based on the price/sales ratio or price/earnings *ratio* for each stock, wherein the stock having the lowest price/sales ratio or price/earnings ratio is ranked the highest.

20. The computer program product of claim 19, wherein the database includes a market cap value table for identifying the market cap value of each company, and wherein the second identifying module includes:

a first selecting module configured to select the price/sales ratio for the companies in a top half of market cap table; and a second selecting module configured to select the price/earnings ratio for the companies in a bottom half of market cap table.

*21. A computer implemented method for reporting on investments, or potential investments, comprising the steps of:*

*receiving a request specifying a selection of stocks from a database of stock information;*

*identifying stocks from the specified selection having buyback ratios, wherein a buyback ratio corresponds to a percentage of shares of issued stock repurchased from the public during a specified period and resulting in a decrease of shares outstanding; and*

*generating a report ranking a set of the identified stocks with buyback ratios based on at least one other selection criteria associated with performance of a corresponding company.*

*22. The method of claim 21, wherein the selection criteria is selected from the group consisting of a price/sales ratio and a price/earnings ratio, for each stock.*

*23. The method of claim 22, wherein the database includes a market cap value table for identifying a market cap value of the company, and wherein the step of generating a report includes the substeps of:*

*selecting the price/sales ratio for the company in a top half of market cap table; and*

*selecting the price/earnings ratio for the company in a bottom half of market cap table.*

*24. The method of claim 21, further comprising:*

*accessing a Standard and Poor index; and wherein the step of identifying stocks includes the substep of*

*identifying any companies having buyback ratios based on information from the Standard and Poor index.*

*25. The method of claim 21, further comprising:*

*accessing a database with information corresponding to a Dow Jones Industrial Average, and*

*wherein the step of identifying stocks includes the substep of*

*identifying any companies having buyback ratios based on the Dow Jones Industrial Average.*

*26. The method of claim 21, wherein the step of identifying stocks based on information in the Dow Jones industrial Average database includes the substep of:*

*identifying the stocks in accordance with a buyback selection level.*

*27. The method of claim 26, wherein the buyback selection level is a price value of the stocks repurchased.*

*28. The method of claim 26, wherein the buyback selection level is a numerical volume of the stocks repurchased.*

*29. The method of claim 21, further comprising the step of:*

*outputting the report.*

*30. The method of claim 21, further comprising the step of:*

*storing the report on a storage medium.*

*31. An apparatus for reporting on investments, or potential investments, comprising:*

*a receiving module configured to receive a request specifying a selection of stocks from a database of stock information;*

*an identifying module configured to identify stocks from the specified selection having buyback ratios, wherein a buyback ratio corresponds to a percentage of shares of issued stock repurchased from the public during a specified period and resulting in a decrease of shares outstanding; and*

*a generating module configured to generate a report ranking a set of the identified stocks with buyback ratios based on at least one other selection criteria associated with performance of a corresponding company.*

*32. The apparatus of claim 31, wherein the selection criteria is selected from the group consisting of a price/sales ratio and a price/earnings ratio, for each stock.*

*33. The apparatus of claim 32, wherein the database includes a market cap value table for identifying a market cap value for the company, and wherein the generating module configured to generate a report includes:*

*a selecting module configured to select the price/sales ratio for the company in a top half of market cap table; and*

*a selecting module configured to select the price/earnings ratio for the company in a bottom half of market cap table.*

*34. The apparatus of claim 31, further comprising:*

*an accessing module configured to access a Standard and Poor index; and wherein the identifying module configured to identify stocks includes:*

*an identifying module configured to identify any companies having buyback ratios based on information from the Standard and Poor index.*

*35. The apparatus of claim 31, further comprising:*

*an accessing module configured to access a database with information corresponding to a Dow Jones Industrial Average, and*

*wherein the identifying module configured to identify stocks includes:*

*an identifying module configured to identify any companies having buyback ratios based on the Dow Jones Industrial Average.*

*36. The apparatus of claim 31, wherein the identifying module configured to identify stocks based on information in the Dow Jones Industrial Average database includes:*

*an identifying module configured to identify the stocks in accordance with a buyback selection level.*

*37. The apparatus of claim 36, wherein the buyback selection level is a price value of the stocks repurchased.*

*38. The apparatus of claim 36, wherein the buyback selection level is a numerical volume of the stocks repurchased.*

*39. The apparatus of claim 31, further comprising:*

*an outputting module configured to output the report.*

*40. The apparatus of claim 31, further comprising:*

*a storing module configured to store the report on a storage medium.*

*41. A computer program product comprising:*

*a computer usable medium having computer readable code embodied therein for reporting on investments, or potential investments, the computer usable medium comprising:*

*a receiving module configured to receive a request specifying a selection of stocks from a database of stock information;*

*an identifying module configured to identify stocks from the specified selection having buyback ratios, wherein a buyback ratio corresponds to a percentage of shares of issued stock repurchased from the public during a specified period and resulting in a decrease for shares outstanding; and*

*a generating module configure to generate a report ranking a set of the identified stocks with buyback ratios based on at least one other selection criteria associated with performance of a corresponding company.*

*42. The computer usable medium of claim 41, wherein the selection criteria is selected from the group consisting of a price/sales ratio and a price/earnings ratio, for each stock.*

*43. The computer usable medium of claim 42, wherein the database includes a market cap value table for identifying a market cap value of the company, and wherein the generating module configured to generate a report includes:*

*a selecting module configured to select the price/sales ratio for the company in a top half of market cap table; and*

*a selecting module configured to select the price/earnings ratio for the company in a bottom half of market cap table.*

*44. The computer usable medium of claim 41, further comprising:*

*an accessing module configured to access a Standard and Poor index; and wherein the identifying module configured to identify stocks includes:*

*an identifying module configured to identify any companies having buyback ratios based on information from the Standard and Poor index.*

*45. The computer usable medium of claim 41, further comprising:*

*an accessing module configured to access a database with information corresponding to a Dow Jones Industrial Average, and*

*wherein the identifying module configured to identify stocks includes:*

*an identifying module configured to identify any companies having buyback ratios based on the Dow Jones Industrial Average.*

*46. The computer usable medium of claim 41, wherein the identifying module configured to identify stocks based on information in the Dow Jones Industrial Average database includes:*

*an identifying module configured to identify the stocks in accordance with a buyback selection level.*

*47. The computer usable medium of claim 46, wherein the buyback selection level is a price value of the stocks repurchased.*

*48. The computer usable medium of claim 46, wherein the buyback selection level is a numerical volume of the stocks repurchased.*

*49. The computer usable medium of claim 41, further comprising:*

*an outputting module configured to output the report.*

*50. The computer usable medium of claim 41, further comprising:*

*a storing module configured to store the report on a storage medium.*

*51. A computer implemented method for selecting investments or potential investments, comprising the steps of:*

*receiving a request specifying a selection of stocks from a database of stock information;*

*identifying stocks from the specified selection having buyback ratios, wherein a buyback ratio corresponds to a percentage of shares of issued stock repurchased from the public during a specified period and resulting in a decrease of shares outstanding; and*

*providing an investment selection selecting at least one of the identified stocks with buyback ratios and reflecting at least one other selection criteria associated with performance of a company corresponding to the at least one selection stock.*

*52. The method of claim 51, wherein the selection criteria is selected from the group comprising a price/sales ratio and a price/earnings ratio, for each stock.*

*53. The method of claim 52, wherein the database includes a market cap value table for identifying a market cap value of the company and wherein the step of providing an investment selection includes the substeps of*

*selecting the price/sales ratio for the company in a top half of the market cap table; and*

*selecting the price/earnings ratio for the company in a bottom half of market cap table.*

*54. The method of claim 51, further comprising:*

*accessing a Standard and Poor index; and wherein the step of identifying stocks includes the substep of*

*identifying any companies having buyback ratios based on information from the Standard and Poor index.*

*55. The method of claim 51, further comprising:*

*accessing a database with information corresponding to a Dow Jones Industrial Average, and*

*wherein the step of identifying stocks includes the substep of*

*identifying any companies having buyback ratios based on the Dow Jones Industrial Average.*

*56. The method of claim 51, wherein the step of identifying stocks based on information in the Dow Jones industrial Average database includes the substep of:*

*identifying the stocks in accordance with a buyback selection level.*

*57. The method of claim 56, wherein the buyback selection level is a price value of the stocks repurchased.*

*58. The method of claim 56, wherein the buyback selection level is a numerical volume of the stocks repurchased.*

*59. The method of claim 51, further comprising the step of:*

*outputting a report.*

*60. The method of claim 51, further comprising the steps of:*

*storing a report in a storage medium.*

*61. An apparatus for selecting investments or potential investments, comprising:*

*a receiving module configured to receive a request specifying a selection of stocks from a database of stock information;*

*an identifying module configured to identify stocks from the specified selection having buyback ratios, wherein a buyback ratio corresponds to a percentage of shares of issued stock repurchased from the public during a specified period and resulting in a decrease of shares outstanding; and*

*a generating module configured to provide an investment selection selecting at least one of the identified stocks with buyback ratios and reflecting at least one other selection criteria associated with performance of a company corresponding to the at least one selected stock.*

*62. The apparatus of claim 61, wherein the selection criteria is selected from the group comprising a price/sales ratio and a price/earnings ratio, for each stock.*

*63. The apparatus of claim 62, wherein the database includes a market cap value table for identifying a market cap value of the company, and wherein the generating module configured to generate a report includes:*

*a selecting module configured to select the price/sales ratio for the company in a top half of market cap table; and*

*a selecting module configured to select the price/earnings ratio for the company in a bottom half of market cap table.*

*64. The apparatus of claim 61, further comprising:*

*an accessing module configured to access a Standard and Poor index; and wherein the identifying module configured to identify stocks includes:*

*an identifying module configured to identify any companies having a buyback ratios based on information from the Standard and Poor index.*

*65. The apparatus of claim 61, further comprising:*

*an accessing module configured to access a database with information corresponding to a Dow Jones Industrial Average, and*

*wherein the identifying module configured to identify stocks includes:*

*an identifying module configured to identify any companies having buyback ratios based on the Dow Jones Industrial Average.*

*66. The apparatus of claim 61, wherein the identifying module configured to identify stocks based on information in the Dow Jones Industrial Average database includes:*

*an identifying module configured to identify the stocks in accordance with a buyback selection level.*

*67. The apparatus of claim 66, wherein the buyback selection level is a price value of the stocks repurchased.*

*68. The apparatus of claim 66, wherein the buyback selection level is a numerical volume of the stocks repurchased.*

*69. The apparatus of claim 61, further comprising:*

*an outputting module configured to output the report.*

*70. The apparatus of claim 61, further comprising:*

*a storing module configured to store the report on a storage medium.*

*71. A computer program product comprising:*

*a computer usable medium having computer readable code embodied therein for selecting investments or potential investments, the computer usable medium comprising:*

*a receiving module configured to receive a request specifying a selection of stocks from a database of stock information;*

*an identifying module configured to identify stocks from the specified selection having buyback ratios, wherein a buyback ratio corresponds to a percentage of shares of issued stock repurchased from the public during a specified period and resulting in a decrease of shares outstanding; and*

*a generating module configured to provide an investment selection selecting at least one of the identified stocks with buyback ratios and reflecting at least one other selection criteria associated with performance of a company corresponding to the at least one selected stock.*

*72. The computer usable medium of claim 71, wherein the selection criteria is selected from the group comprising a price/sales ratio and a price/earnings ratio, for each stock.*

*73. The computer usable medium of claim 72, wherein the database includes*

*a market cap value table for identifying a market cap value of the company, and*

*wherein the generating module configured to generate a report includes:*

*a selecting module configured to select the price/sales ratio for the company in a top half of market cap table; and*

*a selecting module configured to select the price/earnings ratio for the company in a bottom half of market cap table.*

*74. The computer usable medium of claim 71, further comprising:*

*an accessing module configured to access a Standard and Poor index; and wherein the identifying module configured to identify stocks includes:*

*an identifying module configured to identify any companies having buyback ratios based on information from the Standard and Poor index.*

*75. The computer usable medium of claim 71, further comprising:*

*an accessing module configured to access a database with information corresponding to a Dow Jones Industrial Average, and*

*wherein the identifying module configured to identify stocks includes:*

*an identifying module configured to identify any companies having buyback ratios based on the Dow Jones Industrial Average.*

*76. The computer usable medium of claim 71, wherein the identifying module configured to identify stocks based on information in the Dow Jones Industrial Average database includes:*

*an identifying module configured to identify the stocks in accordance with a buyback selection level.*

*77. The computer usable medium of claim 76, wherein the buyback selection level is a price value of the stocks repurchased.*

*78. The computer usable medium of claim 76, wherein the buyback selection level is a numerical volume of the stocks repurchased.*

*79. The computer usable medium of claim 71, further comprising:*

*an outputting module configured to output a report.*

*80. The computer usable medium of claim 79, further comprising:*

*a storing module configured to store the report on a storage medium.*

*81. A computer implemented method for creating a buyback investment report comprising the steps of:*

*receiving a request specifying a selection of stocks from a database of stock information;*

*selecting criteria for screening the selection of stock wherein the selected criteria consists of a buyback ratio and a company performance ratio,*

*screening the selection of stocks, the screening process including the substeps of*

*identifying the stocks from the specified selection having buyback ratios, wherein a buyback ratio corresponds to a percentage of issued stock repurchased from the public during a specified period and resulting in a decrease of shares outstanding, and*

*identifying the company performance ratio for each such stock of a subset of the stocks having buyback ratios, wherein the subset is determined based on the buyback ratio for each stock; and*

*ranking stocks within the subset based on the company performance ratio for each stock, wherein the stock having the lowest company performance ratio is ranked the highest.*

* * * * *

UNITED STATES PATENT AND TRADEMARK OFFICE

CERTIFICATE OF CORRECTION

PATENT NO. : RE 40,091 E
APPLICATION NO. : 09/613153
DATED : February 19, 2008
INVENTOR(S) : David R. Fried It is certified that error appears in the above-identified patent and that said Letters Patent is hereby corrected as shown below:

In claim 9, column 6, lines 20-21, “step of includes” should read --step includes--.

In claim 26, column 8, lines 30-31, “industrial” should read --Industrial--.

In claim 41, column 9, line 54, “configure” should read --configured--.

In claim 64, column 11, line 66, “having a buyback” should read --having buyback--.

Signed and Sealed this

Twenty-seventh Day of May, 2008

JON W. DUDAS
*Director of the United States Patent and Trademark Office*